(12) United States Patent
Dhar et al.

(10) Patent No.: US 6,532,149 B2
(45) Date of Patent: Mar. 11, 2003

(54) PORTABLE COMPUTER HAVING SECONDARY DISPLAY

(76) Inventors: Vasant Dhar, 110 Bleeker St., #22D, New York, NY (US) 10012; Ashok Mirza, 15 Casurina Dr., Noelangarai, Chennai, 600 041 (IN)

( * ) Notice: Subject to any disclaimer, the term of this patent is extended or adjusted under 35 U.S.C. 154(b) by 59 days.

(21) Appl. No.: 09/862,671

(22) Filed: May 22, 2001

(65) Prior Publication Data

US 2002/0176224 A1 Nov. 28, 2002

(51) Int. Cl.[7] .................................................. H05K 7/16
(52) U.S. Cl. ...................... 361/683; 361/680; 248/921; 345/905
(58) Field of Search ................................ 361/683, 687, 361/688, 689, 698, 699, 724–727; 454/184, 353; 248/921–923; 345/168–169, 905

(56) References Cited

U.S. PATENT DOCUMENTS

| | | | | |
|---|---|---|---|---|
| 5,125,610 A | 6/1992 | Queau | ......................... | 248/284 |
| 5,168,423 A | 12/1992 | Uhgami et al. | ............. | 361/683 |
| 5,206,790 A | 4/1993 | Thomas et al. | ............. | 361/683 |
| 5,438,530 A | * 8/1995 | Bettini | ........................ | 361/680 |
| 5,475,626 A | * 12/1995 | Viletto | ........................ | 361/680 |
| 5,559,670 A | 9/1996 | Flint et al. | ................... | 361/681 |
| 5,949,673 A | 9/1999 | Batio | ......................... | 361/681 |
| 6,076,786 A | 6/2000 | Meyer | ........................ | 248/161 |
| 6,198,624 B1 | 3/2001 | Margaritis | ................... | 361/681 |
| 6,275,376 B1 | * 8/2001 | Moon | ......................... | 361/683 |

* cited by examiner

*Primary Examiner*—Darren Schuberg
*Assistant Examiner*—Hung Van Duong
(74) *Attorney, Agent, or Firm*—Fish & Richardson P.C.

(57) ABSTRACT

A portable computer having improved capabilities for facilitating a demonstration to an audience. The computer's main display is pivotably mounted to the keyboard portion of the computer, allowing an audience to view the computer's output. A secondary liquid crystal display is mounted on or near the computer's keyboard, allowing the computer's operator to view the computer's output when the screen is facing the audience. The secondary liquid crystal display can also be operated independently of the main display in order to prolong screen and battery life.

7 Claims, 2 Drawing Sheets

PORTABLE COMPUTER HAVING SECONDARY DISPLAY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention pertains to a portable computer and, more particularly, to a portable computer having a secondary display embedded on the keyboard section of the computer and a pivotable screen to facilitate the presentation of a computer demonstration to an audience sitting opposite or adjacent the computer's operator.

2. Description of the Prior Art

In the course of business or academia, it frequently becomes necessary for two or more individuals to observe a computer's display screen. This is difficult because the computer screen is generally fixed in such a position so as to only allow it to be viewed by those sitting directly in front of the computer. An individual other than the computer's operator wishing to view the contents of the computer's display must stand behind the operator. This is inconvenient, especially where there are numerous members of the viewing audience. Also, fatigue becomes a factor in the case of a lengthy computer demonstration where the audience must stand in one position for a prolonged period of time. Further, standing in one position to view the computer's display screen interferes with the audience's ability to take notes, refer to reference materials or perform other tasks that may be necessary during the demonstration.

The prior art has addressed problems of this nature by mounting the computer screen on a pivot which allows the screen to swing about an axis normal to the computer's keyboard, thereby allowing audience members to view the computer's output. Examples of such a pivotable display are disclosed by U.S. Pat. No. 5,206,790 to Thomas et. al. entitled "Pivot and Swivel Mechanism for Lap Top Display" and U.S. Pat. No. 6,076,786 to Meyer entitled "Adjustable Video Display Screen."

While addressing the problems described above, pivotable displays of the type disclosed by these patents create a new problem not theretofore present. When the display screen is pivoted to a position viewable to the audience members, the computers operator's ability to effectively present the demonstration is hindered as he or she is unable to view the contents of the computer's output. A computer cannot be effectively operated to present a demonstration when the operator cannot view the output.

The present invention overcomes this problem by providing a secondary display adjacent to the computer's keyboard, thereby allowing the computer's operator to view the computer's output while the main screen is facing the audience. The secondary display may be operated with the main display turned off, thereby prolonging the life of the computer's batteries and main display.

SUMMARY OF THE INVENTION

It is a object of the present invention to provide a portable computer having a secondary display on the computer's keyboard.

It is another object of the present invention to provide a pivotable screen for a portable computer which can be viewed by an individual other than the computer's operator.

It is still another object of the present invention to provide a secondary display for a portable computer which can be used to the exclusion of the main display, thereby prolonging the computer's battery life.

It is yet still another object of the present invention to provide a secondary display for a portable computer which can be used to the exclusion of the main display, thereby prolonging the life of the computer's main display.

According to the preferred embodiment of the present invention, there is provided a portable computer having a keyboard section and a display section. The keyboard section and the display section are attached to each other by means of a swivel joint which allows the display section to pivot relative to the keyboard section throughout a 270-degree arc. A guide internal to the swivel prevents the screen section from being pivoted through an arc of greater than 270-degrees, thereby protecting the sensitive electronics connecting the display section and the keyboard section. A secondary liquid crystal display mounted on the portable computer allows the operator to view the computer's output while the display section is turned toward the audience.

The attainment of the foregoing and related objects, advantages and features of the invention should be more readily apparent to those skilled in the art, after review of the following more detailed description of the invention, taken together with the drawings.

DETAILED DESCRIPTION OF THE INVENTION'S PREFERRED EMBODIMENT

Figure 1:
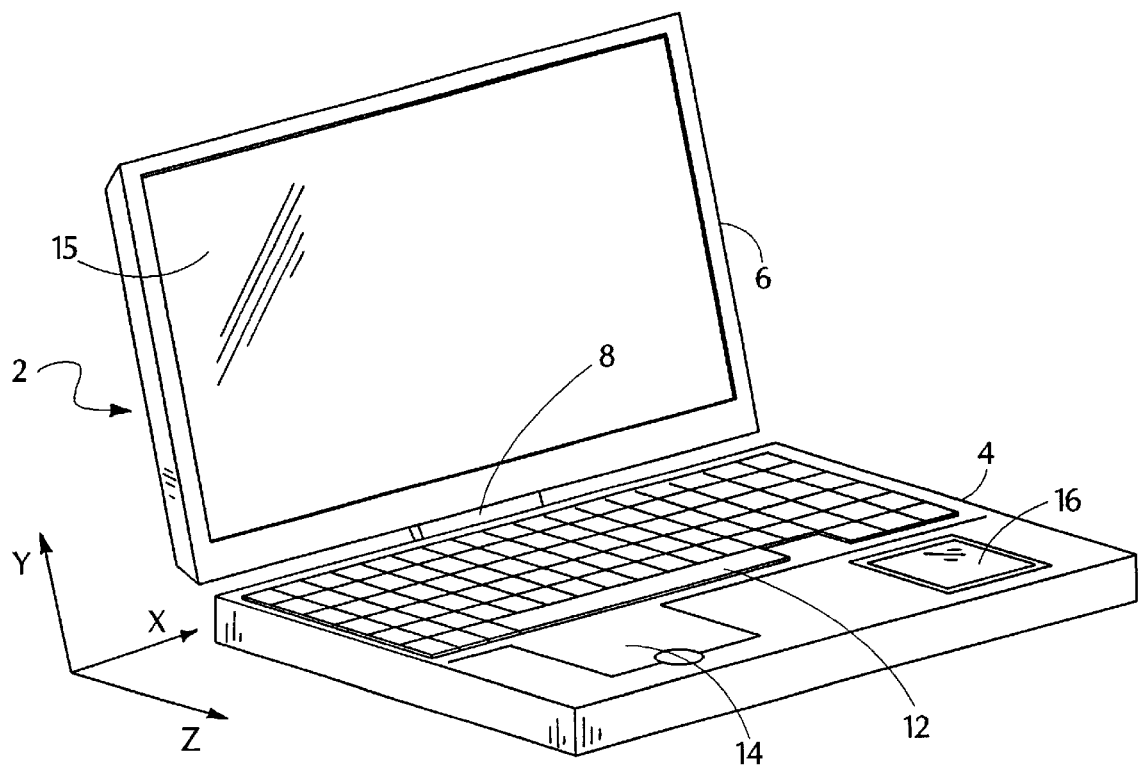
FIG. 1 illustrates a perspective view of a portable computer according to the present invention.

In the following drawings, similar reference numerals denote similar elements throughout the several views.

Turning now to the drawings, more particularly to FIG. 1, there is shown a portable computer 2 in its open and operational position. The portable computer 2 comprises a keyboard section 4 and a display section 6. Keyboard section lies in the plane defined by the x and z axes, as illustrated in FIG. 1. Display section lies in the plane defined by the x an y axes, as illustrated in FIG. 1. Keyboard section 4 is affixed to display section 6 via a pivot mechanism 8, shown in greater detail in FIGS. 3–5. As shown, display section 6 has been tilted upward from its closed position over keyboard section 4 to a position viewable to the computer operator.

As illustrated in FIG. 1, a keyboard 10 is mounted on keyboard section 4. A user input device 14 is positioned beneath the space bar 12 of keyboard 10. In the preferred embodiment of the present invention, the user input device 14 is a "touch screen" on which the computer operator places his or her finger to position the cursor on the screen 15. Of course, the user input device is not limited to a touch screen. A conventional mouse, trackball or pointing stick input device can be used as well.

Still referring to FIG. 1, a secondary display 16 is positioned beneath the space bar 12 of keyboard 10, adjacent to the input device 14. In the preferred embodiment, the secondary display 16 is a standard liquid crystal display. When engaged, the secondary display 16 displays the same output appearing on the portable computer's main screen 15, allowing the computer operator to view the output when the screen is facing the audience.

Adapting the secondary display 16 for use with the portable computer can be accomplished in one of two ways, either of which will be appreciated by an individual of ordinary skill in the art.

Figure 2:
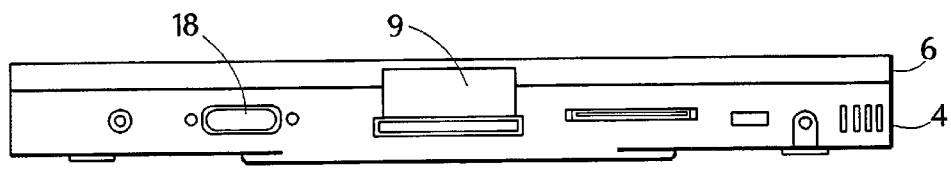
FIG. 2 illustrates a side view of the rear of the portable computer according to the present invention.

Referring now to FIG. 2, portable computer 2 is equipped with a fifteen-pin video output port 18, allowing for the attachment of a VGA monitor, LCD projector or similar external display device. Once attached to the video output port 18 the external display device will display the same output displayed on the computer's main screen 15. A "toggle" feature allows the user to alternate between displaying the output on the main screen 15 or on the external display device connected to video output port 18. The toggle feature is activated by selecting one of the function keys on the computer's keyboard. By using this feature, the user can view the computer's output only on the secondary display, thereby conserving the computer's battery.

In the preferred embodiment of the present invention, the secondary display 16 is a liquid crystal display which is connected to the video output port 18 of portable computer 2. Because video output port 18 delivers a VGA signal, it must be converted to a digital signal before the output can be displayed on the secondary display 16. This requires the use of a converter which will switch the output from a VGA signal to a digital signal. Such a conversion is accomplished by a simple cable connection to the computer's VGA The design and implementation of such an adapter will be known to one of ordinary skill in the art.

Alternatively, the secondary display 16 can be linked to the digital output produced by the portable computer's mother board, before it is converted to a VGA signal. This obviate's the need to convert the signal back to digital form after it has reached the video output port 18. However, such a connection will require special video cards and drivers particular to the display. Linking the secondary display 16 to the computer's mother board in such fashion will be known to one of ordinary skill in the art.

Figure 3:
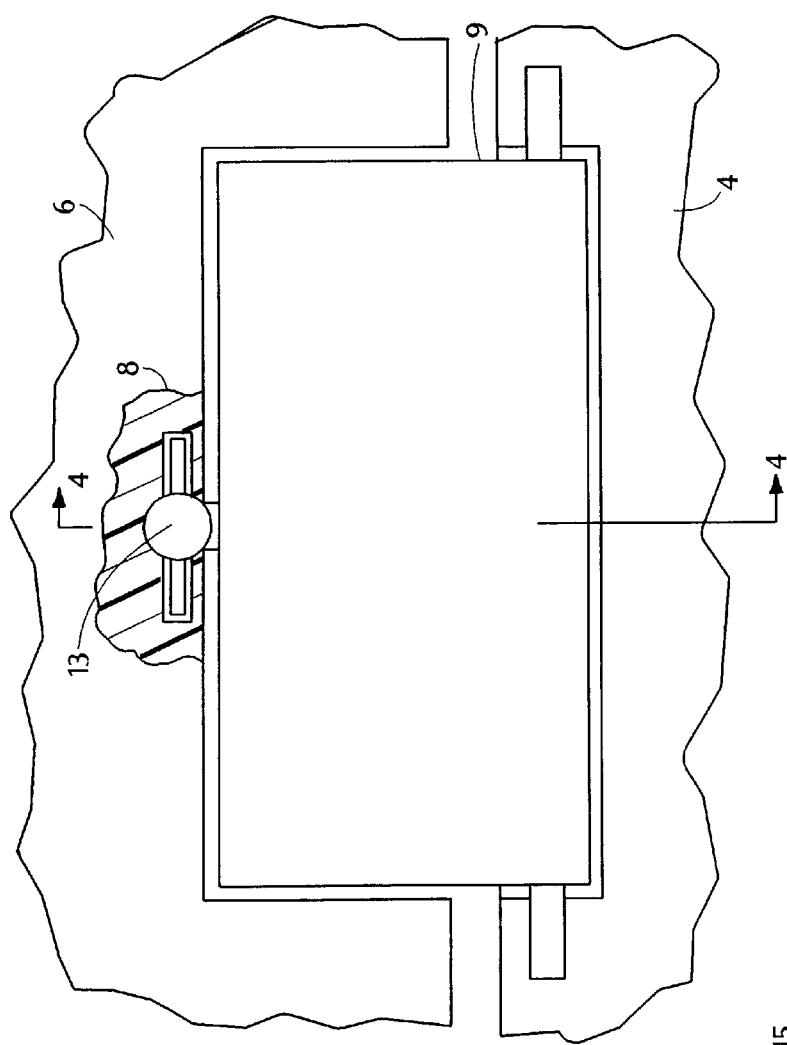
FIG. 3 illustrates a detailed view of the portable computer's pivot means according to the present invention.
Figure 4:
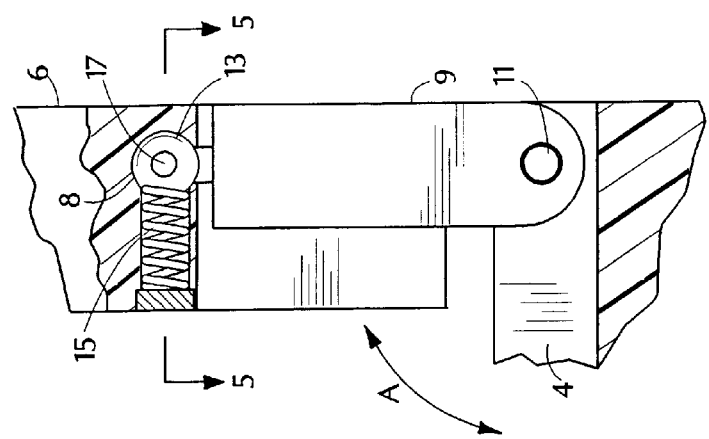
FIG. 4 is a cross section of the pivot means according to the present invention as viewed along line 4—4 in FIG. 3.
Figure 5:
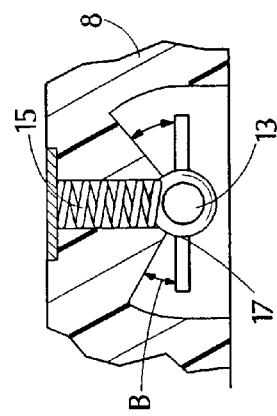
FIG. 5 is a cross section of the pivot means according to the present invention as viewed along line 5—5 in FIG. 4.

Details of the swivel mechanism 8 connecting keyboard section 4 to display section 6 are shown in FIGS. 3–5. While the preferred embodiment is illustrated, any number of mechanisms know in the art can be used, including those illustrated by U.S. Pat. Nos. 5,206,790 and 6,076,786.

Referring to FIG. 4, a pivoting member 9 connects keyboard section 4 to display section 6. Pivoting member 9 is pivotably connected to keyboard section 4 by means of pivoting connection 11 thereby allowing display section 6 to rotate relative to keyboard section 4 about the x-axis as indicated by arrow A. This allows the user to open, close and adjust display section 6 during operation of the computer.

Referring again to FIG. 4, fixedly mounted on the end of pivoting member 9, opposite pivoting connection 11, is bearing 13. Display section 6 is mounted about bearing 13, thereby allowing display section 6 to pivot about keyboard section 4 in a direction about the y-azis, as indicated by arrow B in FIG. 5. Braking spring 15 mounted internal to display section 6 places continuous pressure on bearing 13, thereby preventing display section 6 from rotating out of its preset position without a deliberate force being applied by the user. This represents the preferred embodiment. Any friction device may be substituted in place of the spring. A projection 17 is placed on bearing 13, preventing display section 6 from being continuously pivoted relative to keyboard section 4, thereby protecting the computer's sensitive electronics. Projection 17 permits display section 6 to be rotated 270-degrees counterclockwise and 90-degrees clockwise as those directions are defined in FIG. 5.

It should be apparent to those skilled in the art that various changes in form and details of the invention as shown and described may be made. It is intended that such changes be included within the spirit and scope of the claims appended hereto.

What is claimed is:

1. A portable computer comprising:
   a keyboard section having a keyboard and a secondary liquid crystal display;
   a pivoting member having a first end and a second end; said first end pivotably connected to said keyboard section;
   a bearing mounted on said second end of said pivoting member; and
   a display section pivotably connected to said bearing so that said display section may pivot about an axis normal to the plane in which said keyboard section lies.

2. The portable computer according to claim 1 having braking means mounted on said display section which places continuous pressure on said bearing, thereby preventing said display section from rotating out of a preset position selected by a user of said portable computer.

3. The portable computer according to claim 2 having a projection mounted on said bearing preventing said display section from being pivoted about said axis past a certain position.

4. The portable computer according to claim 3 wherein said position is not greater than 270-degrees.

5. The portable computer according to claim 1 in which said secondary display can be operated while said main liquid crystal display is turned off.

6. The portable computer according to claim 1 in which said portable computer has a VGA output port.

7. The portable computer according to claim 6 in which said secondary display is connected to said VGA output port.

* * * * *